(12) United States Patent
Mohyi Hapipi et al.

(10) Patent No.: US 8,563,889 B2
(45) Date of Patent: Oct. 22, 2013

(54) ELECTRICAL DISCHARGE ASSEMBLY AND METHOD FOR REPAIRING DIFFUSION COOLING PASSAGES

(75) Inventors: Mohammad Dzulkifi B. Mohyi Hapipi, Singapore (SG); Rachel Ng, Singapore (SG); Chee Kit Sam, Singapore (SG)

(73) Assignee: Pratt & Whitney Services Pte Ltd, Singapore (SG)

( * ) Notice: Subject to any disclaimer, the term of this patent is extended or adjusted under 35 U.S.C. 154(b) by 449 days.

(21) Appl. No.: 12/797,281

(22) Filed: Jun. 9, 2010

(65) Prior Publication Data

US 2010/0313405 A1  Dec. 16, 2010

(30) Foreign Application Priority Data

Jun. 9, 2009 (SG) ................. 200903946-2

(51) Int. Cl.
  *B23H 1/04* (2006.01)
  *B23H 9/10* (2006.01)
  *B23H 9/14* (2006.01)
(52) U.S. Cl.
  USPC ........................................ 219/69.15
(58) Field of Classification Search
  USPC ..................... 219/69.15, 69.17; 205/665
  See application file for complete search history.

(56) References Cited

U.S. PATENT DOCUMENTS

| | | | | |
|---|---|---|---|---|
| 3,498,158 A | * | 3/1970 | Kougel ............... | 219/69.17 |
| 5,357,073 A | * | 10/1994 | Tominaga et al. ..... | 219/69.15 |
| 5,507,925 A | * | 4/1996 | Brew .................... | 205/665 |
| 5,605,639 A | * | 2/1997 | Banks et al. .......... | 219/69.17 |
| 5,893,984 A | * | 4/1999 | Thompson ............ | 219/69.15 |
| 6,759,621 B2 | * | 7/2004 | Varin .................... | 219/69.15 |
| 6,897,401 B2 | * | 5/2005 | Kildea .................. | 219/69.17 |
| 7,214,901 B1 | * | 5/2007 | Ball et al. ............. | 219/69.17 |
| 2005/0178744 A1 | * | 8/2005 | Suzuki .................. | 219/69.15 |

FOREIGN PATENT DOCUMENTS

| | | | |
|---|---|---|---|
| EP | 1228832 A1 | | 8/2002 |
| EP | 1286020 A2 | | 2/2003 |
| EP | 1502690 A2 | | 2/2005 |
| JP | 60-259322 A | * | 12/1985 |

OTHER PUBLICATIONS

The extended European Search Report in counterpart European Application No. 10251062.5 filed Sep. 9, 2010.

\* cited by examiner

*Primary Examiner* — Geoffrey S Evans
(74) *Attorney, Agent, or Firm* — Kinney & Lange, P.A.

(57) ABSTRACT

An electrical discharge assembly for processing a workpiece having a cooling passage with first and second portions includes a first electrode having a first shape for machining the first portion of the cooling passage and a second electrode having a second shape for machining the second portion of the cooling passage. In a method for repairing cooling passages in a workpiece, a first electrode having a first shape is positioned in a cooling passage. The first electrode is electrically powered to machine a first portion of the cooling passage. A second electrode having a second shape is positioned in the cooling passage. The second electrode is electrically powered to machine a second portion of the cooling passage.

13 Claims, 7 Drawing Sheets

ELECTRICAL DISCHARGE ASSEMBLY AND METHOD FOR REPAIRING DIFFUSION COOLING PASSAGES

CROSS-REFERENCE TO RELATED APPLICATION(S)

This application claims priority to Singapore Application No. 200903946-2, filed Jun. 9, 2009, the disclosure of which is incorporated by reference in its entirety.

BACKGROUND

The present invention is directed to cooling passage repairs, and more particularly, to a method of repairing diffusion cooling passages and an electrical discharge assembly for carrying out the method.

Because of extreme operating conditions, gas turbine engines are known to employ components having thermal barrier coatings and cooling passages to protect the component by reducing temperature exposure during use. Thermal barrier coatings are selected to provide resistance to spallation (coating loss) during thermal cycling of the engine as well as resistance to oxidizing and corrosive environments. During normal engine operation and after time, a thermal barrier coating will degrade in certain surface areas subjected to strenuous operating conditions. Once a thermal barrier coating's protective ability has been reduced below an acceptable level, removal and reapplication of the coating is required.

Cooling passages allow film cooling of gas turbine components. Film cooling effectiveness can be increased by using diffusion passages that have a conical portion and an enlarged opening at the surface of the component. The shaping of the passages to diffuse air before it enters the boundary layer of the component broadens the spread of air downstream of the passage and thus, increases cooling effectiveness. Although high quality diffusion passages provide superior performance, they are both costly and difficult to form.

In the case of blade repair, the blade may first be stripped of its original coating and then a replacement coating is applied to the blade prior to returning it to service. During this repair process, cooling passages present in the blade may be partially or completely filled with repair or replacement coating material. Such excess material can accumulate in each cooling passage. This phenomenon is known as "coatdown" and can restrict the flow capacity of the affected passages. Coatdown can diminish the cooling effectiveness of the film cooling thereby reducing the component's useful operating life. Thus, any cooling passages that are subject to coatdown are typically unacceptable for return to service and require reworking to remove the excess material before the blade can be put back into service.

Electrical discharge machining (EDM) is a known process for producing shaped passages or other openings in metals. It uses electrical current discharges to erode metal. For example, by pulsing a direct current between a positively charged work piece (anode) and an electrode (cathode), a spark discharge may be produced. The discharge occurs when the potential difference between the electrode and the workpiece, which both contact a dielectric fluid, is great enough to break down the dielectric fluid and produce an electrically conductive channel. Upon application of a voltage or potential, a current flow results with enough heat energy to melt and erode the work piece. This process has application in the machining of small, deep, odd-shaped passages that are cumbersome to produce by other means.

Typical EDM methods for producing or remanufacturing diffusion passages in engine components use a copper electrode manufactured in a three-dimensional shape by stamping and coining. The electrode consists of at least one small diameter elongated end that produces a cooling air metering section. The elongated end connects to a three-dimensional diffuser-shaped portion that produces a diffused area for the diffusion passage. The electrode produces a similar shaped passage, with allowance for electrode overburn and EDM electrode erosion. Unfortunately, known EDM methods are time consuming to operate and are a relatively expensive process compared to other processes such as laser drilling. Furthermore, the copper electrodes of an EDM are fragile and not reusable.

SUMMARY

An electrical discharge assembly for processing a workpiece having a cooling passage with first and second portions includes a first electrode having a first shape for machining the first portion of the cooling passage and a second electrode having a second shape for machining the second portion of the cooling passage.

In a method for repairing cooling passages in a workpiece, a first electrode having a first shape is positioned in a cooling passage. The first electrode is electrically powered to machine a first portion of the cooling passage. A second electrode having a second shape is positioned in the cooling passage. The second electrode is electrically powered to machine a second portion of the cooling passage.

In another method for repairing cooling passages in a workpiece, a first set of electrodes having a first shape is positioned in a first set of cooling passages. A second set of electrodes having a second shape is positioned in a second set of cooling passages. The first set of electrodes is electrically powered to machine first portions of the first set of cooling passages, and the second set of electrodes is electrically powered to machine second portions of the second set of cooling passages. The first set of electrodes is positioned in the second set of cooling passages, and the second set of electrodes is positioned in the first set of cooling passages. The first set of electrodes is electrically powered to machine first portions of the second set of cooling passages, and the second set of electrodes is electrically powered to machine second portions of the first set of cooling passages.

An electrical discharge assembly for repairing cooling passages of a workpiece, where the cooling passages include a metering portion and a diffused portion, includes a first electrode having a portion with a generally triangular prism shape for machining a diffused portion of the cooling passage and a second generally cylindrical electrode for machining the metering portion of the cooling passage.

In a method for repairing a workpiece having a cooling passage, a ceramic coating and a bond coating are removed from the workpiece, and the workpiece is brazed. A bond coating is applied to the workpiece. Braze material and bond coating are removed from the cooling passages by positioning a first electrode having a first shape into the cooling passage, electrically powering the first electrode to machine a first portion of the cooling passage, positioning a second electrode having a second shape into the cooling passage and electrically powering the second electrode to machine a second portion of the cooling passage. A ceramic coating is applied to the workpiece.

DETAILED DESCRIPTION

The apparatus and method of the present invention is used in the manufacture or repair of a workpiece having cooling passages. The workpiece can include gas turbine components, such as blades or vanes, or other articles with cooling passages that are coated, in particular with a thermal barrier coating system. A thermal barrier coating system can include a metallic bond coat and a ceramic top coat. The apparatus and method of the present invention provide an improved process for removing repair material from cooling passages in a workpiece during manufacture or repair of the workpiece. In order to better understand the present invention, the repair process for a turbine vane with cooling passages is described below.

Figure 1:
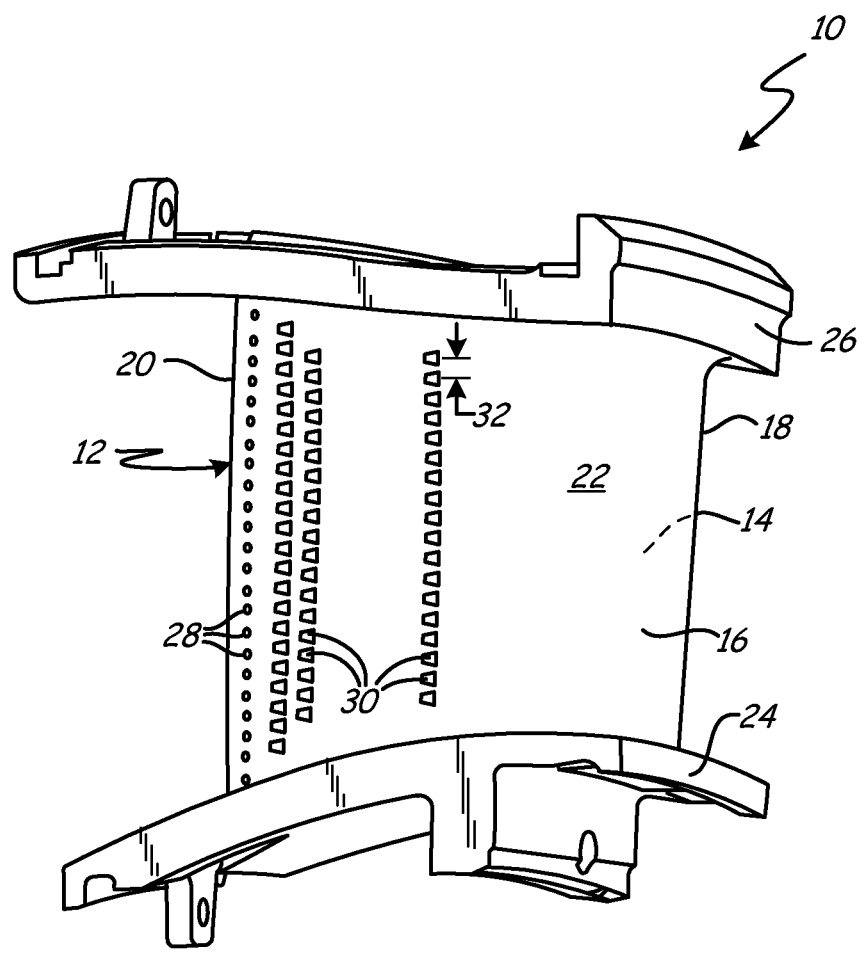
FIG. 1 is a perspective view of a gas turbine engine vane with cooling passages.

FIG. 1 shows turbine vane (article of manufacture, workpiece) 10, which includes airfoil section (airfoil) 12 having at least one internal cavity (not shown). Airfoil 12 includes convex surface 14, concave surface 16, trailing edge 18 and leading edge 20. Convex surface 14 and concave surface 16 are located on opposite sides of airfoil 12 and meet at trailing edge 18 and leading edge 20. Together, convex surface 14, concave surface 16, trailing edge 18 and leading edge 20 form airfoil exterior surface 22, which is exposed to a hot gas path during operation. Airfoil 12 is bounded by inner diameter platform 24 and outer diameter platform 26.

Vane 10 lies in the hot gas path and is air-cooled by flowing cooling air, typically discharged from a compressor, into the internal cavity or cavities of vane 10. Cooling air enters the internal cavity through corresponding openings in platforms 24, 26. This air cools internal surfaces of airfoil 12 by convection or internal baffle impingement and cools convex and concave surfaces 14 and 16, respectively, of airfoil 12 by film cooling. The air is directed from the internal cavity and outward across airfoil 12 by a plurality of cooling passages, preferably cylindrical cooling passages 28 and diffusion cooling passages (diffusion passages) 30, to help vane 10 withstand the high temperatures to which it is exposed. Although FIG. 1 shows cooling passages 28, 30 located on concave surface 16, it is readily understood by those skilled in the art that cooling passages 28, 30 are formed on both convex and concave surfaces 14, 16, respectively. Diffusion passages 30 can be arranged in rows and spaced from one another by center-to-center distance 32.

During operation, vane 10 is subjected to high temperatures that can cause cracks and other damage to occur on airfoil 12. Once vane 10 is damaged, it must be repaired before it can be returned to service. The repair process includes several steps, which are illustrated in FIG. 2 and described below.

Figure 2:
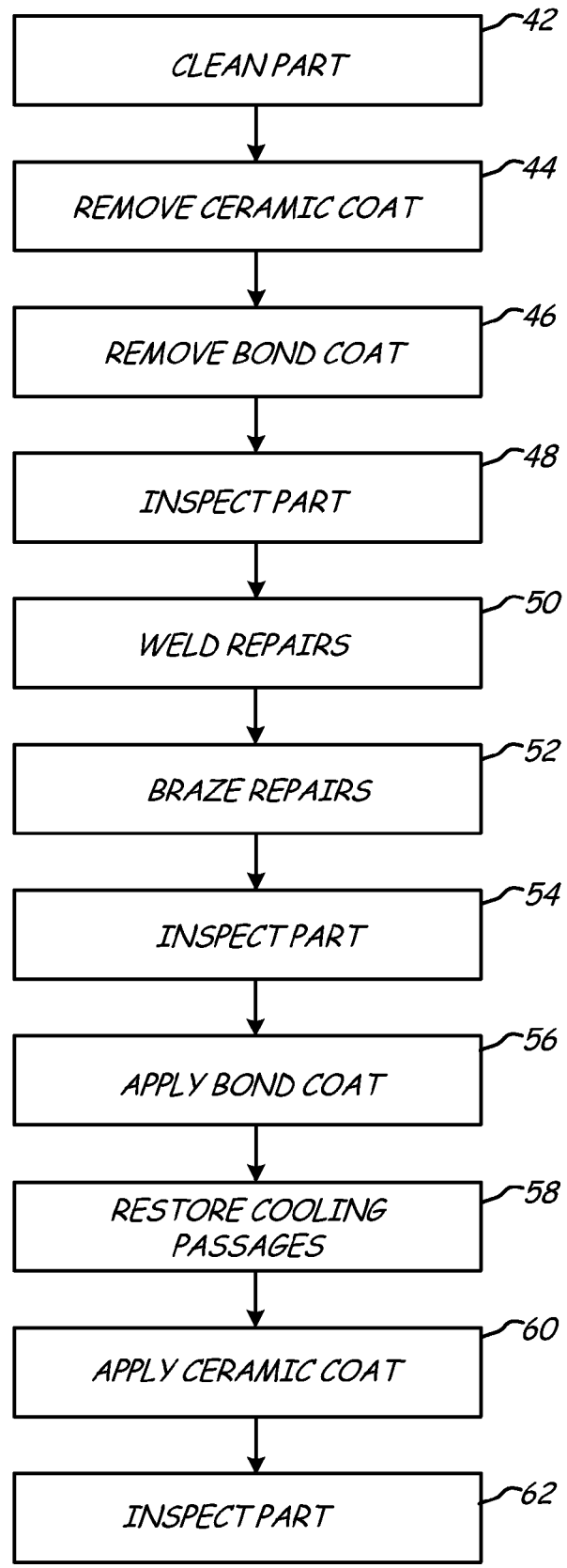
FIG. 2 is a flow diagram illustrating a method for repairing a gas turbine engine vane.

FIG. 2 is a flow diagram illustrating method 40 for repairing a vane. Vane 10 is first cleaned (step 42), usually with an aqueous solution. Detachable details such as baffles and similar parts are then removed, as appropriate. Any ceramic top coat is removed from vane 10 using any conventional method known in the art (step 44). For example, the ceramic top coat and oxidized coating can be removed by autoclave cleaning in potassium hydroxide (KOH), grit blasting, or other methods. After the ceramic top coat is removed, any metallic bond coat is stripped using methods known in the art (step 46). For example, the metallic bond coat can be removed by immersing vane 10 in an agitated stripping solution, or any other method known in the art. Following an inspection (step 48), any identified cracks in vane 10 that fall within acceptable service limits are routed to remove oxidation material and dirt. Next, vane 10 is cleaned, for example, by a grit blasting process followed by ultrasonic cleaning, powerflushing and hydrogen fluoride (HF) cleaning to ensure removal of any residual abrasive material. Then, the identified cracks are welded (step 50).

After welding step 50, a braze repair material is selectively applied to surface imperfections, such as cracks, including in the vicinity of and within selected cooling passages 28, 30 that do not meet serviceable inspection criteria (step 52). For example, repair material is applied to cooling passages 28, 30 adjacent to cracks less than about 100 mils wide. Repair material can be manually applied using a dispensing tool that applies a predetermined quantity of repair material in a predetermined time interval at a predetermined pressure to each defect area (e.g., cooling passage identified during the inspection). In this way, each identified defect is completely filled with repair material. The repair material is heated to complete braze repair step 52. Excess repair material can then be blended using conventional blending or smoothing techniques. At this point in the repair process, cooling passages 28, 30 are filled with the repair material.

Following the braze repair and a subsequent inspection (step 54), a metallic bond coat is deposited onto the surface of vane 10 by any method known in the art for depositing such materials (step 56). For example, the metallic bond coat can be deposited by using low or reduced pressure plasma spray, air plasma spray, electron beam physical vapor deposition, or other methods. The metallic bond coat is deposited onto the entire surface of vane 10, including over the repair material contained within cooling passages 28, 30. Following deposition of the metallic bond coat, the repair material is removed from cooling passages 28, 30 (step 58). The apparatus and method of the present invention is used to remove the repair material from diffusion passages 30. Once the repair material is removed from cooling passages 28, 30, a ceramic top coat is deposited onto the surface of vane 10 (step 60). Following deposition of the ceramic top coat, vane 10 is again inspected (step 62) before being returned to service when the repair is successful.

Figure 3:
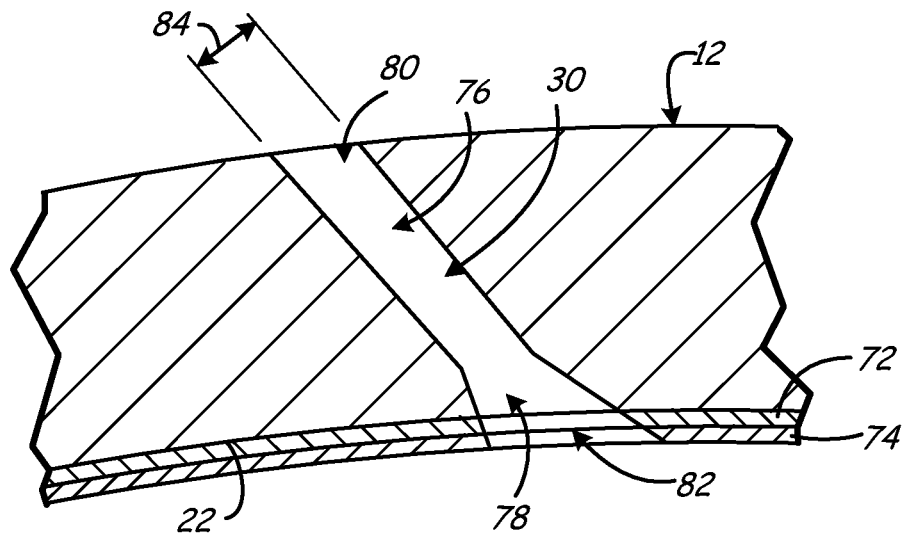
FIG. 3 is a cross-sectional view of an airfoil illustrating a diffusion cooling passage.

FIG. 3 illustrates a cross-sectional view of the wall thickness of airfoil 12, and in particular diffusion passage 30. To protect vane 10 (see FIG. 1) from high temperatures, airfoil 12 is coated with a protective surface coating, preferably a thermal barrier coating system. The thermal barrier coating system includes metallic bond coat 72 disposed over airfoil exterior surface 22 and ceramic top coat 74 on top of metallic bond coat 72. FIG. 2 shows airfoil 12 before the repair process has started. Airfoil 12 includes diffusion passage 30 which can have various geometries and predetermined air flow characteristics based on its location within airfoil 12. Diffusion passage 30 includes metering portion 76 in fluid communication with diffused portion 78, each having a predetermined geometry. Metering portion 76 includes inlet 80 with inlet diameter 84, which provides a predetermined air flow requirement. Inlet 80 regulates cooling air flow into diffusion passage 30 from the internal cavity of vane 10. Diffused portion 78 is axially diverging in the direction of the cooling air flow, nonregulating and extends from metering portion 76 to outlet 82 at exterior surface 22 of vane 10. Diffused portion 78 facilitates the film cooling of exterior surface 22 of airfoil 12 as cooling air exits from diffused portion 78 of diffusion passage 30.

Figure 4:
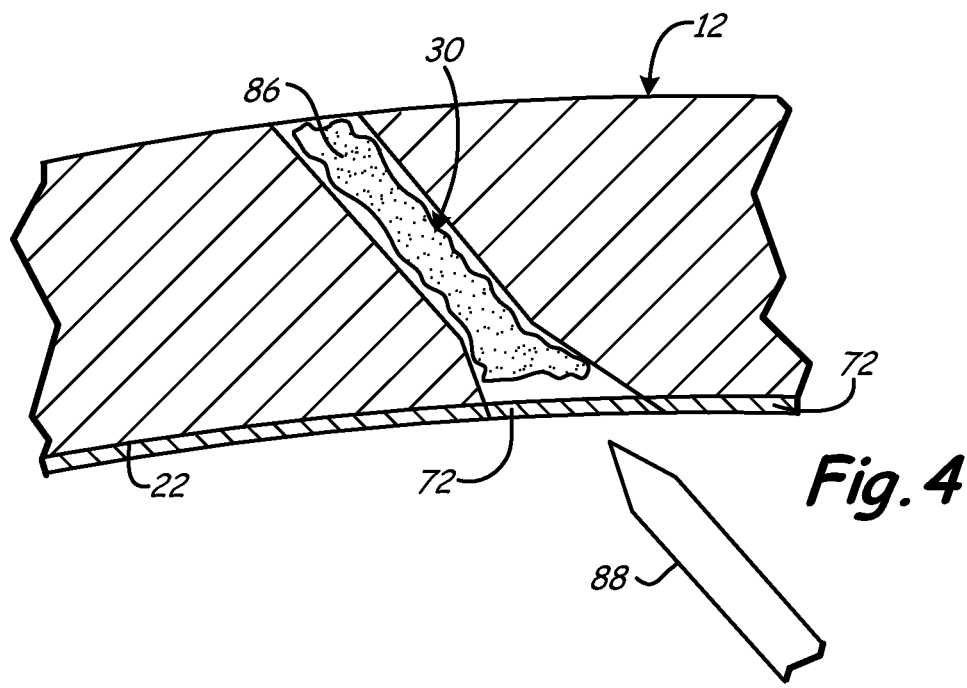
FIG. 4 is a cross-sectional view of an airfoil at an intermediate stage of the repair process and an EDM electrode.
Figure 5:
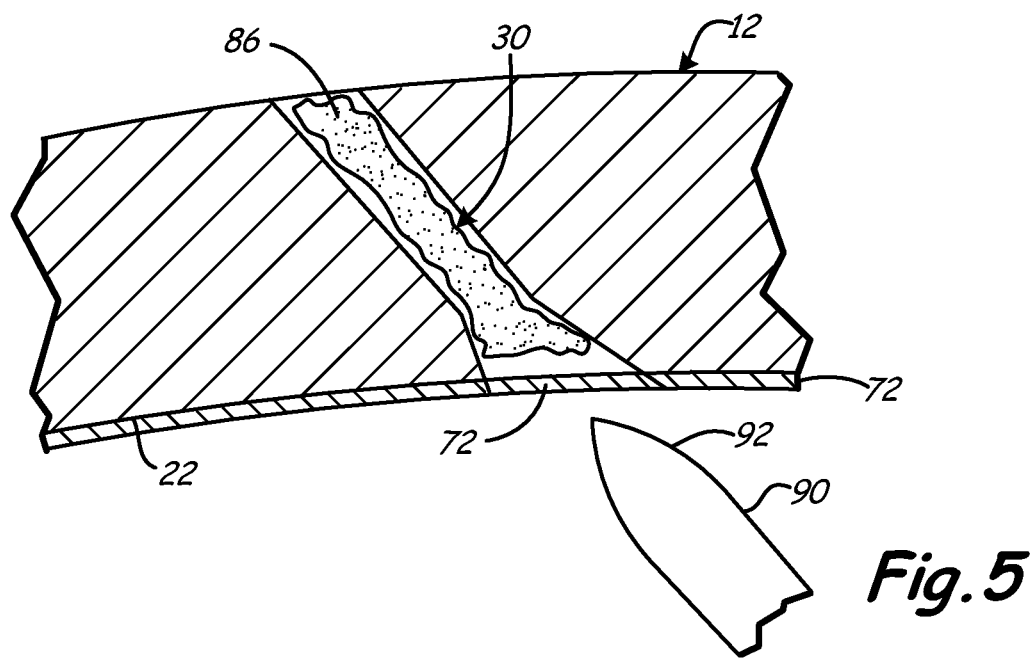
FIG. 5 is a cross-sectional view of an airfoil at an intermediate stage of the repair process and another EDM electrode.

FIGS. 4 and 5 illustrate airfoil 12 at an intermediate stage of the repair process shown in FIG. 2. At this stage, metallic bond coat has been applied following the welding and braze repairs and cooling passages 28, 30 have not yet been restored. FIG. 4 illustrates airfoil 12 in which diffusion passage 30 is filled with braze repair material 86. Additionally, metallic bond coat 72, applied after braze repair material 86, covers outlet 82 of diffusion passage 30. FIG. 4 also illustrates EDM electrode 88 suitable for removing braze repair material 86 and metallic bond coat 72 from diffusion passage 30. As shown in FIG. 4, electrode 88 is a long, slender and generally cylindrical electrode. Electrode 88 is suitable for machining metering portion 76 of diffusion passage 30. Electrode 88 is inserted into diffusion passage 30 from airfoil exterior surface 22 so that it substantially fills metering portion 76. Electrode 88 also extends through part of diffused portion 78. In some instances, a portion of electrode 88 can extend past inlet 80 and into the internal cavity of vane 10. When electrically powered, electrode 88 removes braze repair material 86 from metering portion 76 and braze repair material 86 and metallic bond coat 72 from an area of diffused portion 78 through which it extends.

FIG. 5 illustrates airfoil 12 in which diffusion passage 30 is filled with braze repair material 86 and covered with metallic bond coat 72. FIG. 5 also illustrates EDM electrode 90 suitable for removing braze repair material 86 and metallic bond coat 72 from diffusion passage 30. Electrode 90 is a tapered electrode with a first portion 92 having a generally triangular prism shape. Electrode 90 generally has a larger transverse cross-sectional area than electrode 88. Electrode 90 is suitable for machining diffused portion 78 of diffusion passage 30. Electrode 90 is inserted into diffusion passage 30 from airfoil exterior surface 22 so that it substantially fills diffused portion 78. Electrode 90 is configured to fit within diffused portion 78 without extending completely through metering portion 76. When electrically powered, electrode 90 removes braze repair material 86 and metallic bond coat 72 from diffused portion 78.

The geometries of electrodes 88, 90 are selected to correspond to the shapes of metering portion 76 and diffused portion 78 of diffusion passage 30, respectively. In particular, electrode 88 is configured to remove braze repair material 86 from metering portion 76, and electrode 90 is configured to remove braze repair material 86 and metallic bond coat 72 from diffused portion 78. Both electrodes 88, 90 work cooperatively to ensure that the predetermined air flow requirements of diffusion passages 30 are met once repair is complete. Once repair braze repair material 86 is removed from metering portion 76 and braze repair material 86 and metallic bond coat 72 are removed from diffused portion 78, cooling air is able to flow through diffusion passage 30 to cool vane 10.

Figure 6:
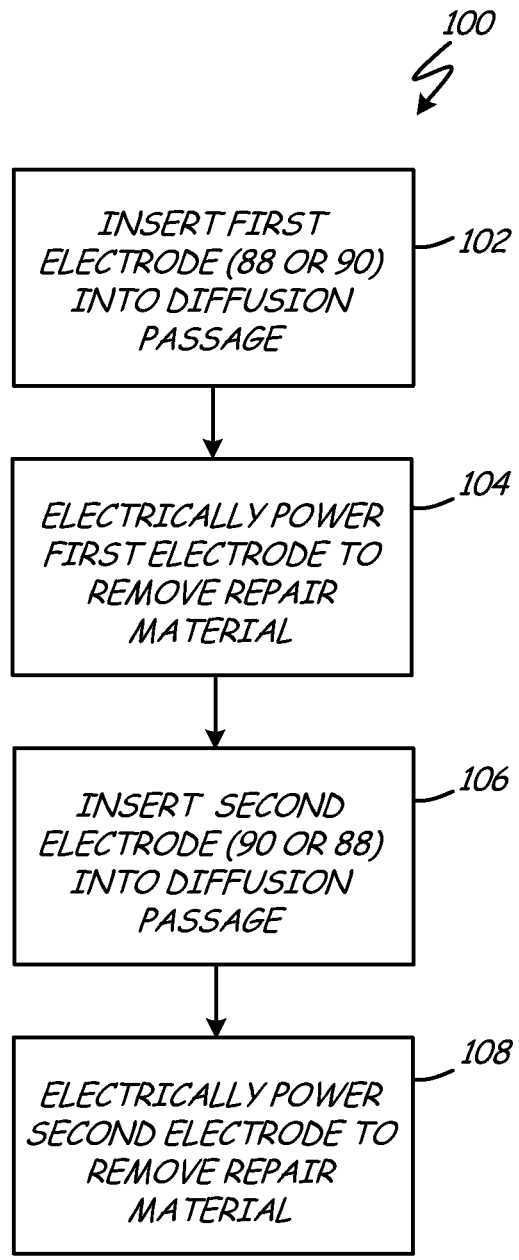
FIG. 6 is a flow diagram illustrating a method for removing repair material from cooling passages.

Braze repair material 86 is removed from diffusion passage 30 using both electrode 88 and electrode 90. The method of the present invention utilizes a two-step process that provides for multiple electric discharges from electrodes 88, 90 and reduces servicing costs by reducing setup times. FIG. 6 illustrates method 100, which can be used to remove braze repair material 86 (and metallic bond coat 72) from diffusion passage 30 using electrodes 88, 90. Method 100 includes inserting electrode 88 in diffusion passage 30 (step 102), electrically powering electrode 88 to remove braze repair material 86 from metering portion 76 of diffusion passage 30 (step 104), inserting electrode 90 in diffusion passage 30 (step 106) and electrically powering electrode 90 to remove braze repair material 86 from diffused portion 78 of diffusion passage 30 (step 108). According to method 100, electrode 88 is used before electrode 90 to remove braze repair material 86 from diffusion passage 30. Alternatively, electrode 90 can be positioned in diffusion passage 30 and electrically powered to remove braze repair material 86 before the same is done with electrode 88. In steps 102 and 106, electrode 88 and electrode 90 are both inserted into diffusion passage 30 from the same side (airfoil exterior surface 22) of airfoil 12.

Figure 7:
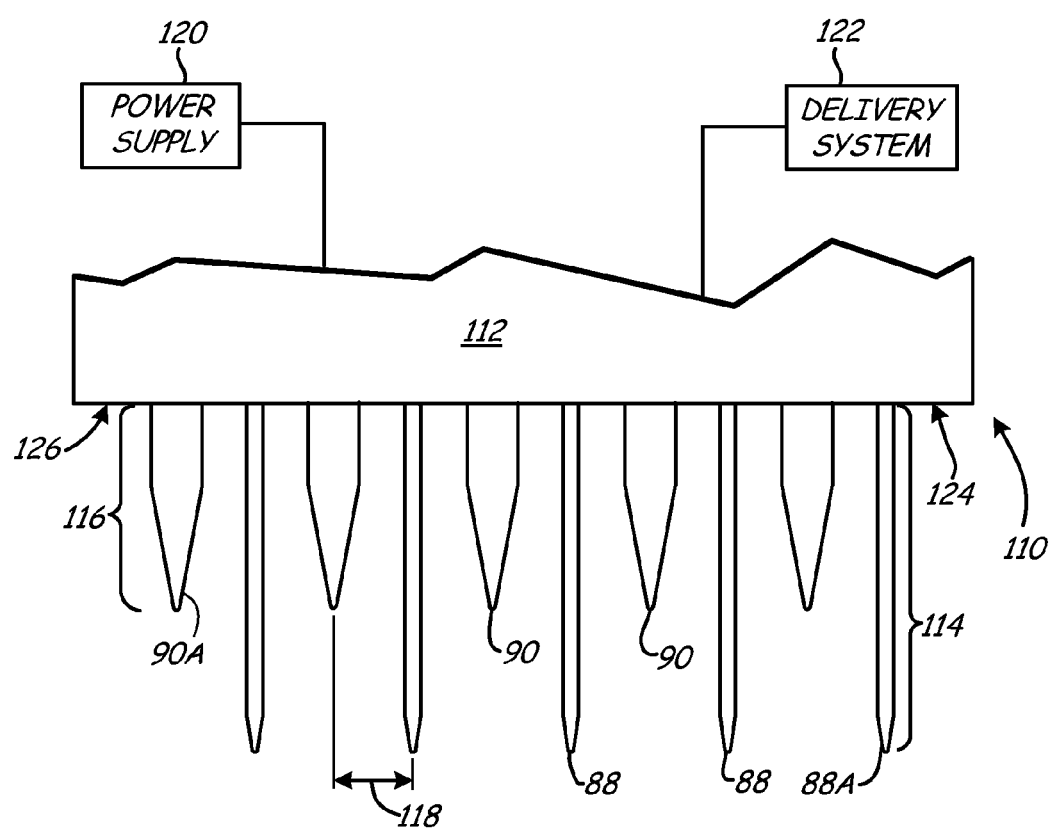
FIG. 7 is a side view of an electrode assembly suitable for repairing cooling passages.

FIG. 7 illustrates electrical discharge assembly 110 suitable for the two-step diffusion passage remanufacturing process of method 100. Electrical discharge assembly 110 includes electrodes 88, 90 and at least one electrode carriage 112. As illustrated in FIG. 7, electrodes 88 and electrodes 90 are mounted on a single electrode carriage 112. In other embodiments of electrical discharge assembly 110, electrodes 88 and electrodes 90 are mounted on two separate electrode carriages 112. Electrodes 88, 90 can be arranged in arrays on electrode carriage 112. Electrode array 114 includes electrodes 88 and electrode array 116 includes electrodes 90. As illustrated in FIG. 7, each electrode array 114, 116 contains five electrodes and electrodes 88, 90 are arranged in an alternating configuration (e.g., electrode 88, electrode 90, 88, 90, etc.). Each electrode 88, 90 is laterally spaced from an adjacent electrode 88, 90 by center-to-center distance 118. Distance 118 is generally equal to distance 32 (see FIG. 1) between adjacent diffusion passages 30 on airfoil 12. Depending on the diffusion passage geometries and distances 32 of airfoil 12, distance 118 can be the same for all electrodes 88, 90 or varied. Distance 118 between adjacent electrodes 88, 90 is determined so that each electrode 88, 90 on electrode carriage 112 can be positioned within a diffusion passage 30.

Electrode carriage 112 holds electrodes 88, 90 in position and conveys electrodes 88, 90 to vane 10 for electrical discharge machining. Power supply 120 is used to deliver electrical power to electrodes 88, 90. A dielectric fluid can be delivered to diffusion passages 30 just prior to electric discharge. The dielectric fluid helps to prevent localized temperature increases without interfering with electrical discharges. Electrical discharge assembly 110 can contain delivery system 122 for supplying airfoil 12 with dielectric fluid during operation.

Figure 8A:
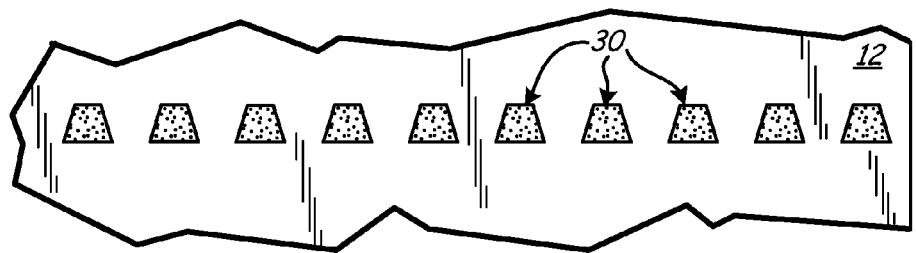
FIG. 8A is a planar view of a row of cooling passages on an airfoil before repair material is removed from the cooling passages.
Figure 8B:
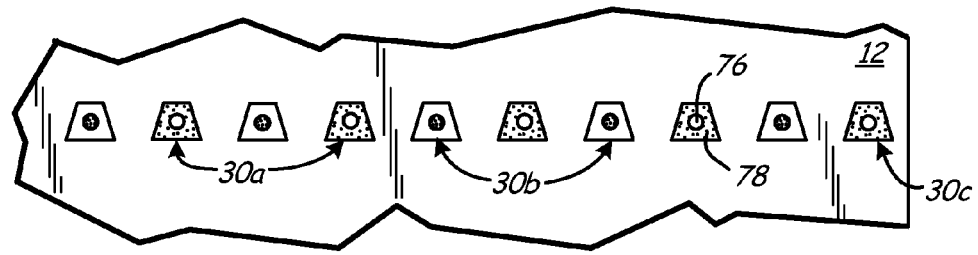
FIG. 8B is a planar view of a row of cooling passages on an airfoil after one electrical discharge from the electrode assembly of FIG. 7.

Method 100 will be described in further detail with reference to electrical discharge assembly 110 as shown in FIG. 7 in which electrode carriage 112 includes electrode arrays 114, 116, in an alternating arrangement. FIG. 8A illustrates diffusion passages 30 before method 100 is performed. FIG. 8A is a planar view of airfoil 12 of vane 10. As shown, diffusion passages 30 contain braze repair material 86 and metallic bond coat 72. Prior to electrode insertion step 102, electrode carriage 112 aligns electrodes 88 of electrode array 114 with a first set of diffusion passages 30a. Simultaneously, electrode carriage 112 aligns electrodes 90 of electrode array 116 with a second set of diffusion passages 30b. In this case, diffusion passages 30a and 30b are in a single row on vane 10 and alternate (diffusion passage 30a, 30b, 30a, 30b, etc.). In electrode insertion step 102, electrodes 88 are inserted into diffusion passages 30a and electrodes 90 are inserted into diffusion passages 30b. During electrical discharge step 104, electrodes 88 are electrically powered to remove braze repair material 86 from metering portions 76 of first diffusion passages 30a. Simultaneously, electrodes 90 are electrically powered to remove braze repair material 86 (and metallic bond coat 72) from diffused portions 78 of second diffusion passages 30b. FIG. 8B is a planar view of airfoil 12 of vane 10 and generally indicates diffusion passages 30a and 30b after one electrical discharge by electrodes 88 and 90, respectively. Diffusion passages 30a have cleared metering portions 76, but some braze repair material 86 and metallic bond coat 72 remains in diffused portions 78. Diffusion passages 30b have cleared diffused portions 78, but braze repair material 86 remains in metering portions 76.

Figure 8C:
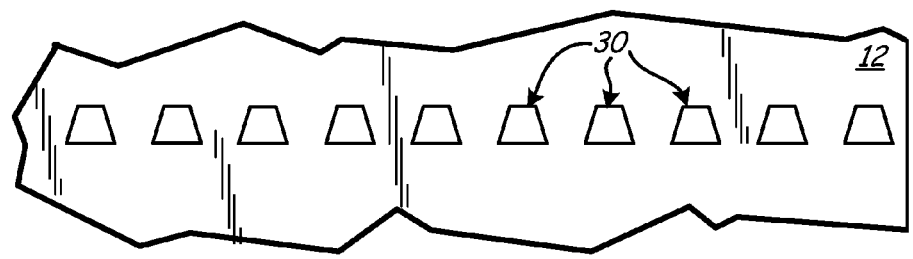
FIG. 8C is a planar view of a row of cooling passages on an airfoil once the repair material has been removed from the cooling passages.

After electrical discharge step 104, electrodes 88 and 90 are removed from diffusion passages 30a and 30b, respectively. Electrode carriage 112 then laterally shifts so that electrodes 88 are aligned with second diffusion passages 30b and electrodes 90 are aligned with first diffusion passages 30a. Electrodes 88 are then inserted into second diffusion passages 30b and electrodes 90 are inserted into first diffusion passages 30a (electrode insertion step 106). Electrodes 88 and 90 are then electrically powered to remove braze repair material 86 from diffusion passages 30b and 30a, respectively (electrical discharge step 108). Electrodes 88 remove braze repair material 86 from metering portions 76 of second diffusion passages 30b, and electrodes 90 remove braze repair material 86 from diffused portions 78 of first diffusion passages 30a. After this second electrical discharge, electrodes 88 and 90 are removed from diffusion passages 30b and 30a, respectively. FIG. 8C is a planar view of airfoil 12 of vane 10 and generally indicates diffusion passages 30 after one electrical discharge by each electrode 88 and 90 in each diffusion passage 30. Following the second discharge, metering portions 76 and diffused portions 78 of both first and second diffusion passages 30a, 30b are substantially free of braze repair material 86 and metallic bond coat 72 and diffusion passages 30 are suitable for subsequent repair steps.

In one embodiment, electrodes 88 and electrodes 90 are mounted on separate electrode carriages 112. Electrical discharge assembly 110 contains a number of electrodes 88 and electrodes 90 equal to the number of diffusion passages 30 on airfoil 12. In this case, each diffusion passage 30 on airfoil 12 receives an electrode 88, 90 when the respective electrode carriage 112 inserts electrodes 88, 90 into diffusion passages 30. As described in FIG. 6, electrodes 88 are inserted into diffusion passages 30 and then electrically powered to remove braze repair material 86 from metering portions 76 of diffusion passages 30. Electrodes 88 are removed and electrodes 90 are inserted into diffusion passages 30 and then electrically powered to remove braze repair material 86 from diffused portions 78 of diffusion passages 30. Alternatively, electrodes 90 are inserted and electrically powered first, followed by electrodes 88.

In another embodiment, electrical discharge assembly 110 contains a single electrode carriage 112 having a combined total number of electrodes 88 and electrodes 90 equal to the number of diffusion passages 30 on airfoil 12. In this case, each diffusion passage 30 on airfoil 12 receives an electrode 88 or an electrode 90 when electrode carriage 112 inserts electrodes 88, 90 into diffusion passages 30. After the first electrical discharge, airfoil 12 resembles the airfoil 12 shown in FIG. 8B. Electrode carriage 112 removes electrodes 88, 90 from airfoil 12 and laterally shifts one position to the left. In order to machine diffused portions 78 of rightmost diffusion passage 30c (see FIG. 8B), electrode 90a (see FIG. 7) is removed from its original position on electrode carriage 112 and repositioned on electrode carriage 112 at position 124. Electrodes 88, 90 are then inserted into diffusion passages 30 of airfoil 12 with the adjusted (shifted) positioning and electrically powered to remove braze repair material 86 from diffusion passages 30a, 30b, and 30c so that metered portions 76 and diffused portions 78 are substantially free of braze repair material 86 in all diffusion passages 30.

In an alternate embodiment, electrode carriage 112 shifts one position to the right after the initial electrical discharge and electrode 88a is removed from its original position on electrode carriage 112 and repositioned on electrode carriage 112 at position 126. In another embodiment, electrode 90a or electrode 88a is removed from electrode carriage 112 for the second electrical discharge. Outer diffusion passages 30 (e.g., diffusion passage 30c) are then electrically discharged by single electrodes 88, 90 to remove braze repair material 86. In yet another alternate embodiment, after the first electrical discharge, electrode carriage 112 is rotated 180° so that the positions of electrode 90a and electrode 88a are reversed. In this embodiment, rotation takes the place of lateral shifting.

Electrodes 88, 90 are constructed from a material suitable for electrical discharge machining, and more preferably, a material suitable for multiple electrical discharges before electrode reshaping is required. One such suitable material is copper tungsten. While copper electrodes used in other EDM techniques allow for only a single use, copper tungsten electrodes according to the present invention provide for multiple electrical discharges before the electrode shape deteriorates and is no longer suitable for repairing diffusion passages 30. In one embodiment, copper tungsten electrodes 88, 90 are suitable for about three electrical discharges. Since electrodes 88, 90 can be used multiple times, electrodes 88, 90 need to be replaced less often, and less time is needed for electrode assembly setup. Due to their relatively simple geometries, electrodes 88, 90 can be reground and shaped for subsequent additional use after about three electrical discharges, thereby reducing costs associated with producing new electrodes.

The present invention provides for a method of removing repair material from diffusion cooling passages and an electrical discharge assembly having cooperative electrodes capable of removing repair material from diffusion cooling passages. The electrodes remove the repair material from diffusion cooling passages according to a two-step process and are suitable for multiple electrical discharges. The design of the electrical discharge assembly and electrodes offers a method of removing repair material from diffusion cooling passages with reduced setup times and costs.

Although the present invention has been described with reference to preferred embodiments, workers skilled in the art will recognize that changes may be made in form and detail without departing from the spirit and scope of the invention.

The invention claimed is:

1. An electrical discharge assembly for processing a workpiece having a first surface, a second surface, and a cooling passage communicating between the first and second surfaces, the passage having a first portion open at the first surface and a second portion open at the second surface, the assembly comprising:

a plurality of first electrodes having a first shape for machining the first portion of the cooling passage; and a plurality of second electrodes having a second shape for machining the second portion of the cooling passage, wherein the first and second electrodes are arranged on the electrode discharge assembly in an alternating arrangement.

2. The electrical discharge assembly of claim 1, wherein the first and second electrodes are configured to be inserted into the cooling passage at the first portion.

3. The electrical discharge assembly of claim 2, wherein the second electrode is shaped to extend through the cooling passage and beyond the second surface when the second electrode is inserted into the cooling passage.

4. The electrical discharge assembly of claim 1, wherein the first and second electrodes are generally equally spaced along the assembly.

5. The electrical discharge assembly of claim 1, wherein the first electrode has a greater cross-sectional area than the second electrode.

6. The electrical discharge assembly of claim 1 further comprising:
   a delivery system for supplying a dielectric fluid to the cooling passage.

7. The electrical discharge assembly of claim 1, further comprising:
   an electrode support, wherein the pluralities of first and second electrodes are positioned so that one of the first electrodes can machine the first portion of the cooling passage and an adjacent second electrode can machine a second portion of an adjacent cooling passage simultaneously.

8. The electrical discharge assembly of claim 1, wherein the first electrode has a portion with a generally triangular prism shape and the second electrode is generally cylindrical.

9. The electrical discharge assembly of claim 1, wherein the first and second electrodes are copper tungsten.

10. The electrical discharge assembly of claim 1 further comprising:
    a power supply for electrically powering the first and second electrodes.

11. An electrical discharge assembly for repairing cooling passages of a workpiece, the cooling passages including a metering portion and a diffused portion, the electrical discharge assembly comprising:
    a plurality of first electrodes having a portion with a generally triangular prism shape for machining a diffused portion of the cooling passage in the workpiece; and
    a plurality of second generally cylindrical electrodes for machining the metering portion of the cooling passage, wherein the first and second electrodes are arranged on the electrode discharge assembly in an alternating arrangement.

12. The electrical discharge assembly of claim 11, wherein the first and second electrodes are generally equally spaced along the electrode discharge assembly.

13. The electrical discharge assembly of claim 11, wherein the first and second electrodes are copper tungsten.

* * * * *